March 19, 1957     D. B. CAPLES ET AL     2,785,592

MAGNETIC POSITION LOCATING AND CONTROLLING PROBE AND SYSTEM

Filed Dec. 23, 1952     3 Sheets-Sheet 1

Inventors:
Donald B. Caples
Richard B. Willoughby
By
their Attorney

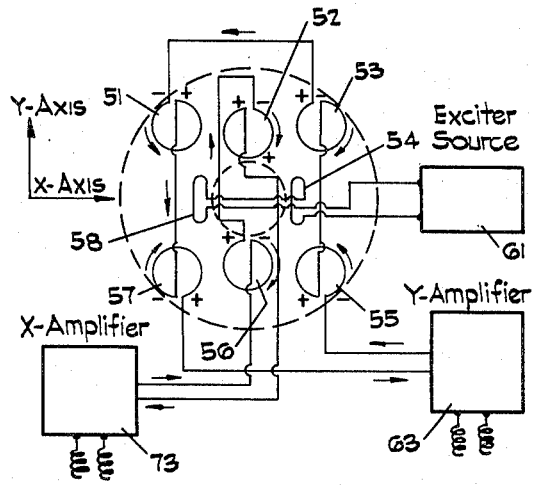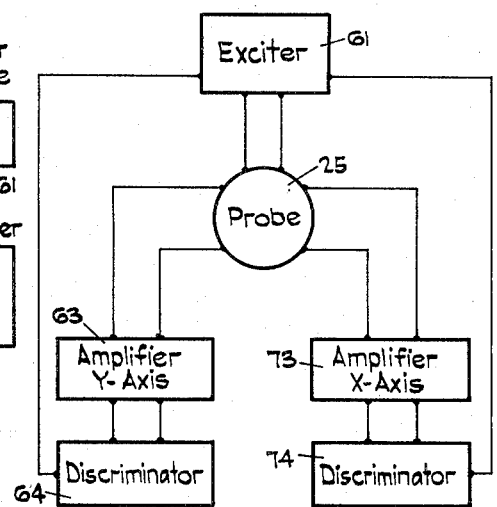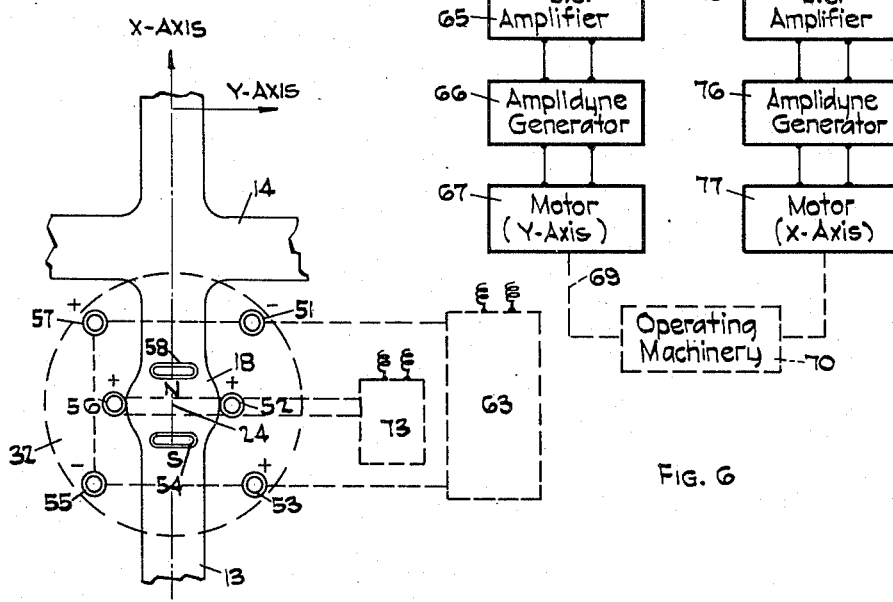

March 19, 1957   D. B. CAPLES ET AL   2,785,592
MAGNETIC POSITION LOCATING AND CONTROLLING PROBE AND SYSTEM
Filed Dec. 23, 1952   3 Sheets-Sheet 3

Inventors:
Donald B. Caples
Richard B. Willoughby
By
Their Attorney

United States Patent Office 2,785,592
Patented Mar. 19, 1957

2,785,592
MAGNETIC POSITION LOCATING AND CONTROLLING PROBE AND SYSTEM

Donald B. Caples, Berkeley, and Richard B. Willoughby, Concord, Calif., assignors to Shell Development Company, Emeryville, Calif., a corporation of Delaware Application December 23, 1952, Serial No. 327,596

7 Claims. (Cl. 77—64)

This invention pertains to magnetic apparatus for automatically controlling a sequence of operations during a production process, and relates more particularly to a magnetic means for continuously determining and indicating the exact position of two bodies with regard to each other, and/or automatically controlling the relative motion of said bodies to a desired mutual position in which a desired operation can be performed by one of said bodies on the other, said working position being determined with a high degree of accuracy.

U. S. Letters Patents 2,540,588 and 2,540,589 describe magnetic apparatus capable of locating flaws or local variations in the composition or density of metallic bodies, as well as variations or changes in the cross-section or other dimensional parameters of said bodies.

It is the object of the present invention to provide a magnetic apparatus particularly adapted to determine or sense, from properties such as density, chemical composition, and more particularly the geometrical configuration of a metallic body on which an operation is to be performed at a specified or predetermined point, the exact location of said predetermined point.

It is also an object of this invention to provide for this purpose an apparatus comprising a probe or sensing head capable of effecting said determination by suitable reaction to magnetic field changes occurring at or near the location of said predetermined point, and of utilizing said magnetic field changes to produce an electric current which, after suitable amplification, may be used to indicate said point and/or to move said body to the position at which said desired operation, such as drilling, tapping, spot welding, riveting, etc., can be performed.

It is also an object of this invention to provide for the purpose described a magnetic probe or sensing head or element of special design whereby the desired results may be achieved with extremely high accuracy and at a very rapid rate.

These and other objects of this invention will be understood from the following specification taken with regard to the attached drawings, wherein:

Fig. 4 is a diagram showing the electrical connections of the probe of Fig. 2;

Figs. 5 and 7 are diagrams illustrating the operation of the present probe on a structure of the type of Fig. 1;

Fig. 6 is a block diagram showing various electrical units which may be connected with the present probe;

Figure 1:
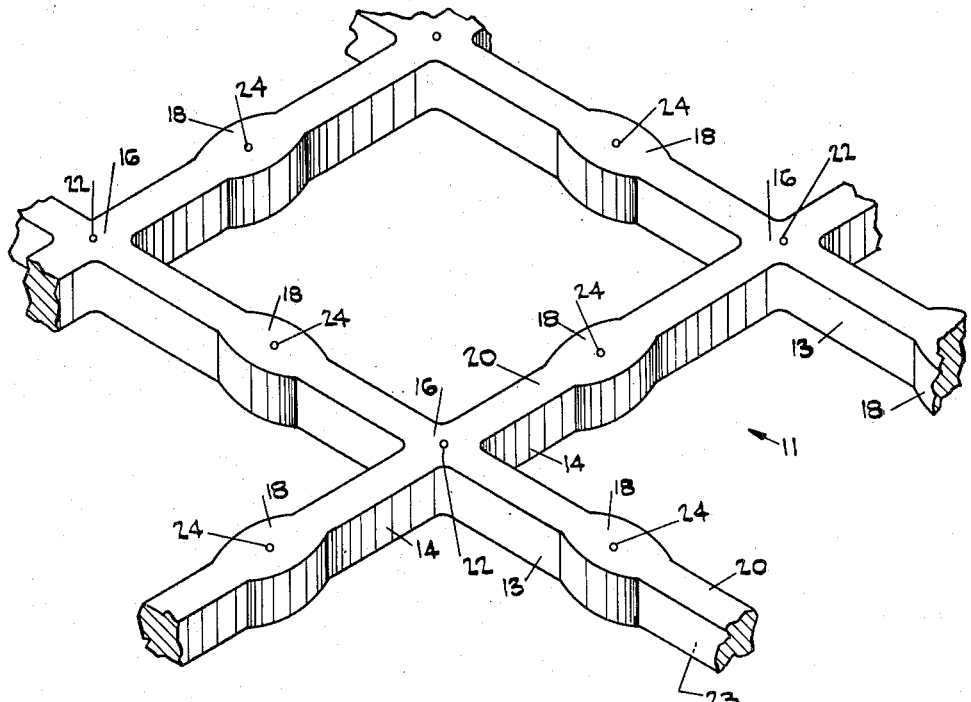
Fig. 1 illustrates a typical metallic body, web structure or work adapted to be operated upon in a manner involving the use of the present invention.

Referring to the drawings, description will be made, for purposes of simplicity, with regard to a body, structure or work for example as generally shown at 11 in Fig. 1, on which work the operations of drilling and/or riveting are performed at predetermined points automatically located by means of the present invention, it being understood that said invention can equally be applied to structures of a different shape or nature for the purpose of performing thereon any other operations, such as punching, tapping, countersinking, spot welding and so forth, as will be readily understood from the following description.

In Fig. 1, the numeral 11 is generally used to designate a grid or weblike structure made of aluminum, magnesium, duralumin or any other suitable metal or alloy, which structure may be used, for example, as part of the assembly of an airplane wing, aileron or other element.

The weblike structure 11 may consist of rectilinear members 13 or 14 of a quadrangular cross-section, which may be molded, stamped or otherwise formed so as to intersect each other at right angles, or at any desired angle, thereby forming a single or integrated structure, the intersection points or zones being indicated at 16. The bar elements 13 and 14 ay further have thereon thickened or reinforced portions 18, regularly or irregularly spaced from each other, as will appear hereinbelow.

In the construction of airplanes it may be desired to place the reinforcing web structure 11 between two enveloping layers, sheets or skins of a material such as aluminum, magnesium, etc., one of said skins being applied to the upper horizontal faces of the bars 13 and 14, and the other skin being applied to the lower face thereof, indicated at 23.

It may be further desired to affix the skins to the web structure by riveting them together through holes drilled therethrough at predetermined points, such as points 22 at the intersections, and points 24 at substantially the center of the thickened portions 18.

It will be appreciated that, once the structure 11 is encased between the two skins, the task of locating the predetermined or specified points 22 and 24 for the purpose of drilling rivet holes at said points is quite difficult, as it cannot be effected by the aid of visual means. The difficulties are further increased when the web structure 11 is an irregular one, and when the accuracy with which the points 22 and 24 must be located is very high. Any methods and systems hitherto used for this purpose have therefore necessarily been quite cumbersome and time consuming.

Figures 2, 3:
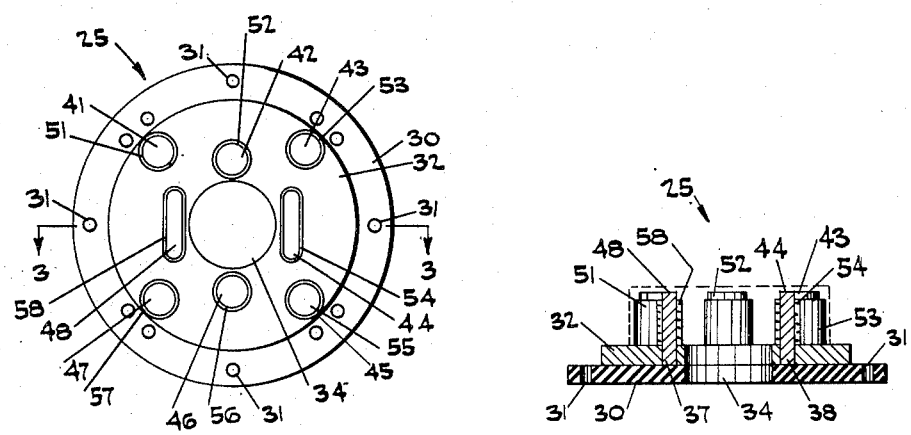
Fig. 2 is a plan view of the probe or sensing head or element of the present invention.
Fig. 3 is an elevation view in cross-section of the probe of Fig. 2.

In order to locate with a high accuracy of the order of 0.005 inch or better the predetermined blind points at which the drilling, riveting, etc., operations are to be performed, the present invention contemplates the use of a magnetic probe or sensing element such as shown in Figs. 2 and 3.

This probe element, generally indicated by the numeral 25, comprises a magnetic core structure preferably made of a material having a high permeability such as an alloy technically known as "Mumetal," which consists of approximately 77% nickel, 15% iron, 5% copper and 1.5% chromium. In general, the core structure consists of a base plate 32, normally circular as shown, carrying a number of mandrel members, rods, etc., as shown at 41—48, extending at right angles thereto and serving as magnetic cores to a plurality of coils 51—58 wound thereon. The cores are generally made of the same material as the plate 32 and form a single and magnetically integral structure therewith, which is effected by imbedding their ends in the plate or by machining the plate and cores as one structure.

The plate and core structure is clamped, cemented, or otherwise fixedly attached to a mounting base or block 30 for holding the magnetic structure in position with regard to the work. The mounting base is normally made of an insulating material so that it may also carry terminals for coil lead connection, openings 31 being provided for the leads.

When it is desired to perform work, such as drilling, riveting, etc., at a point determined by means of the probe, without first moving the probe laterally, the magnetic base plate 32 and mounting plate 30 have a central aperture therein for said drilling or riveting tools to pass therethrough, the probe being thus coordinated in shape or structure as well as in the sequence of operation with the particular tool used in the operation.

It is possible to vary the number, size, shape, and geometric pattern of the cores, coils, and the probe itself to give optimum results for the geometric configuration of the structure in which a predetermined point is to be located. Thus the base plates 30 and 32 need not be annular, and the opening 34 need not be circular, but may be of any desired closed or open polygonal shape permitting the probe to be coordinated in space with a desired tool during the operation of said tool. For the type of structure shown in Fig. 1, the particular arrangement of Fig. 2 is preferred as giving excellent results insofar as accuracy and reliability of results obtained are concerned.

The probe of Fig. 2 has eight coil elements, of which the six sensing coils 51, 52, 53, 55, 56 and 57 are wound on cylindrical core elements 41, 42, 43, 45, 46 and 47, while the two exciter or energizing coils 54 and 58 are wound on cores 44 and 48 having a flattened or elongated shape.

Fig. 4 gives the circuit diagram of the present probe. It will be seen that the elongated or flattened exciter coils 54 and 58 serve, together with the cores 44 and 48 on which they are wound, as driving poles, being energized by an alternating current from an exciter source 61. Any suitable frequency from about 200 to about 3000 cycles per second may be used; especially satisfactory results having been obtained with the probe of Fig. 2 when using a frequency of about 1600 cycles per second.

Coils 51, 53, 55 and 57 (reference to their respective cores will now be omitted for simplicity), serve as sensing elements for magnetically determining the location of a desired or predetermined point, line or plane along one of the two coordinate axes of motion, for example, the X-axis, while the coils 52 and 56 serve as sensing elements along the other or Y-axis.

Coils 51 and 57 are connected differentially or in opposition to each other, and so are coils 53 and 55, said two pairs of coils being then connected in series to double the voltage output available therefrom. The coils 52 and 56 are connected additively.

The operation of the present probe will further be described with regard to Fig. 5, wherein said probe is shown positioned adjacent (above or below) a metallic structure which may be similar to that indicated by the numeral 11 in Fig. 1. It is assumed that the structural member and the probe are being displaced relative to each other along the X-axis, elements 51, 53, 55 and 57 (whose circuit is only diagrammatically indicated by dotted lines in Fig. 5) being used to sense, indicate and/or control any deviation from the X-axis center line, and elements 52 and 56 being used to sense, indicate and/or control, and in particular to stop said motion when the center point of the probe is in register with a point 24, where a mechanical operation is to be performed, said point 24 being located, for example, in a Y-axis plane where the cross-section of the thickened portion 18 has its largest value.

If the instantaneous excitation of the driving coils or poles 54 and 58 is such that at a given moment the pole 58 has, for example, a north value, it will be seen that the pickup coils 51 and 57, which are both acted upon by said pole and which are connected to each other in series opposition, will produce equal opposing voltages which will act to neutralize each other. The same can be said with regard to the coils 53 and 55 which are simultaneously being acted upon by driving pole 54, which is at that instant a south pole. The output current produced by the whole combination of coils 51, 57, 55 and 53 and applied to the amplifier 63 will therefore be zero if the permeances of the magnetic flux paths between pole 58 and coils 51 and 57 on one hand, and between pole 54 and coils 53 and 55 on the other hand, are equal, making the effect of the two poles on the two pairs of coils likewise equal. Since the distances between said poles and coils are fixed, the permeances of said paths can change only because of a change in the nature or space distribution of the material along said paths. Thus, it will be seen that since the effective magnetic permeability of the metallic member 13 is different from that of air, due to eddy currents therein, any displacement of the probe with regard to the center line of said probe will result in an unbalance of the magnetic linkages between pole 58 and coils 51 and 57, respectively, to which will be added an unbalance of the same sign occurring between pole 54 and coils 53 and 55, respectively, the current produced by said unbalances being applied to the amplifier 63.

The two remaining sensing coils 52 and 56 are located near the inner circumference of the annular plate 32, and are thus positioned close to the exciter coils or poles 54 and 58, likewise located at said inner circumference. Each of the coils 52 and 56 is therefore affected equally by each of the poles 54 and 58, one of said poles being a north and the other a south pole at any given instant. Since the coils 52 and 56 are connected additively, their individual outputs and, therefore, combined electrical output is likewise equal to zero in the case of equal and symmetrical magnetic flux paths to poles 54 and 58. When, however, this symmetry and equality is disturbed, the resulting magnetic unbalance produces an electric unbalance current transmitted to the amplifier 73. Thus, for example, as the probe moves along the X-axis in the direction indicated by the arrow and approaches the rounded and thickened portion 18, there is at first an unbalance due to the fact that more metallic material is introduced in the space between pole 58 and coils 52—56 than there is of said material between pole 54 and said coils. A signal of a particular sign or polarity is therefore applied to the amplifier 73. When the probe reaches the position shown in Fig. 5, that is the position in which the cross-section of the member 13 along the Y-axis between the coils 52 and 56 has its greatest value, the signal tends to reverse its sign, as a continued displacement of the member 13 with regard to the probe along the X-axis, tends to reverse the relative proportions of the metallic material between coils 52 and 56 and poles 54 and 58, respectively. This reversal of the sign of the signal current or voltage may be used to arrest or to control the relative motion of the probe and the member 13, as will be outlined hereinbelow.

Fig. 6 gives a block diagram of the circuit by means of which the signals from the probe 25 may be made to control the operation of the motors responsible for the motion of the work and the probe with regard to each other. The exciter source 61 supplies an energizing alternating current to the poles 54 and 58. The coils 51, 53, 55 and 57 have their output connected to the Y-axis amplifier 63. The output of amplifier 63 goes to a discriminator circuit 64, to which is also applied a gating signal from exciter source 61. The output of the discriminator 64 is amplified by a D. C. amplifier 65 and is applied to the field of an amplidyne generator 66. The output of the amplidyne generator is used to energize a motor 67, which effects or controls through mechanical transmission means 69, the relative motion along the Y-axis of the probe and the work with regard to each other.

In the same manner, the signals from the coils 52 and 56 are transmitted, through the X-axis elements 73—76, corresponding to Y-axis elements 63—66, to the motor 77, likewise mechanically linked to the operating machinery 70 to control the desired motion along the X-axis.

Figure 7:
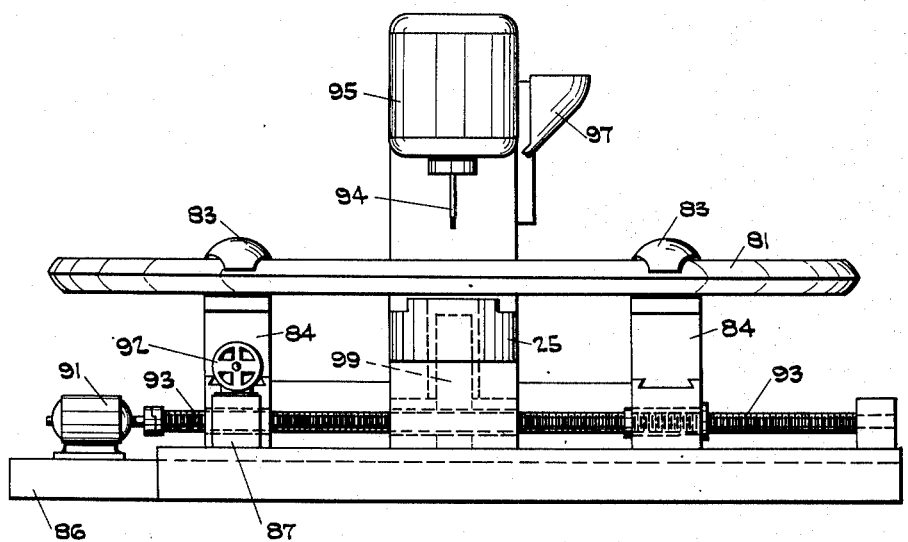

The general mode of operation of the machinery 70 may be outlined as follows with regard to the diagram of Fig. 7.

The work, for example, the web structure comprising the cross-members 13 and 14 of Fig. 1, sheathed by an aluminum skin 81, is rigidly held between upper and lower clamp or support members 83 and 84. The present probe 25 is installed adjacent the lower face of the work and is connected by the circuits of Fig. 6, located at 86 and 87 in Fig. 7, to the motors 91 and 92 adapted to impart, by means such for example as a lead screw 93, any desired motion along the X and Y axes to the clamp supports and the work held thereby. When a desired point or line, for example, the vertical center line of the intersection 16 between the members 13 and 14, comes to coincide with the vertical center line of the probe 25, the output of the probe becomes zero, and the motors 91 and 92 stop. A tool, such for example as a drill 94, held in a head 95, is lowered to drill a hole along the desired center line through the work and into the free passage at the center of the probe 25. After the hole has been drilled, the drill 94 is retracted, and the movement of the work held by the clamps is resumed in a direction and to an extent controlled by the indications of the probe 25, as described hereinabove.

If, instead of, or additionally to drilling, it is desired to perform some other operation, such for example as riveting, this may be effected by dropping, in well known manner, a rivet into a previously drilled hole from a rivet hopper 97, and upsetting the ends of said rivet between a hammer member (not shown), which is in such case substituted for the drill 93, and an anvil member 99 which may be raised through the central opening of the present probe.

It should be particularly noted that the above description of an industrial operation performed in connection with the use of the present probe, and of the industrial instrumentation necessary therefore, is given hereinabove only in the broadest and most general terms as not forming part of the present invention, but being either well known in industrial art or forming the subject matter of separate inventions. Said operations and instrumentation are therefore described only insofar as necessary to outline the scope of the present invention, which includes broadly the utilization of the signal from a magnetic probe or sensing head for the actuation of tools capable of performing an operation on a body whose shape and configuration has been or is being explored by said probe, the structure of said probe or sensing element being in turn such as to permit it to cooperate with said machinery while said operation is being performed.

With regard to the action of the sensing head, it has been mentioned that coil 52 receives excitation from both poles 54 and 58, and that as poles 54 and 58 are opposite in phase, the net effect at 52 is zero when the permeances of both paths to 52 is equal. Coil 56 is arranged in the same manner as 52, and the outputs of the two coils 52 and 56, are additive. If, therefore, the flux from 54 is greater than that from 58, both 52 and 56 develop a net voltage in phase with the flux change of 54, and the output is the sum of that from both coils.

In a somewhat similar manner, coils 53 and 55 both receive excitation from pole 54. Their outputs are in opposition and when the paths are equal the differential output from the two coils is zero. Coils 51 and 57 are connected similarly and measure differential changes in the paths from excitation coil 58. The outputs of the two pairs, 53—55 and 51—57 are additive to give a sum ouput, and also to give the best average zero position if the center line through the excitation poles is not the same as that of the structure on which the operation is to be performed.

A discriminator must be used if the sensing head is to indicate the direction of deviation of the work piece from a desired position. Such an indication, actual or implied, can be used to locate the work to the desired position. The discriminator produces an output voltage for either of two signals 180 degrees apart in phase which have a predetermined phase angle relative to that of the excitation voltage applied to the sensing head. Any signal having a component along this phase angle line of maximum sensitivity will produce an output from the discriminator of a polarity determined by the direction of deviation from the center point. Any signal, or component of signal, having a phase angle 90° from this line of maximum sensitivity will produce no net positive or negative output from the discriminator, and will, therefore, have zero sensitivity as far as the system is concerned. This fact is made use of, as shown below, to eliminate a possibility of error which could otherwise occur.

The sensing head may be subjected to a tilt with regard to the work in spite of all precautions for maintaining a strictly predetermined position. As a tilt also changes the relative amount and/or physical position of material in the differential paths from the excitation coils or poles to the sensing coils, an output from the probe will be produced. This is an undesirable signal which could add to, or subtract from, the true signal due to deviation and give an erroneous indication of center. If, however, the output signal due to tilt can be separated in phase angle (as near 90° as possible) from the signal due to deviation, the discriminator, as described above, can be set for zero sensitivity to tilt signal which will then cause no error. The preferred shape of the sensing head is, in part, determined by the phase angle of output due to deviation with respect to that due to tilt.

It has been found that the ratio of metal to air in the flux path from an excitation pole to a pick-up pole affects the phase angle of the output due to deviation. This effect has been used for the particular structure 11 described hereinabove to separate the deviation and tilt output phase angles. The method used to accomplish this result is to increase one of the dimensions of the excitation pole in such direction as to bring it closer to the edges of the faces 23 or 20 of the work, which reduces the ratio of metal to air in the flux path to any sensing coil and results in a more favorable output phase angle as described above. The magnitude of the output due to deviation was also increased by using the wide excitation poles 54 and 58.

In general the sensing head dimensions and geometry are determined by the geometry of work to be handled with regard to sensitivity, favorable phase angle of output, etc. to eliminate or minimize unwanted signals and to meet physical limitations, such as spacing in operations to be performed.

Figure 8:
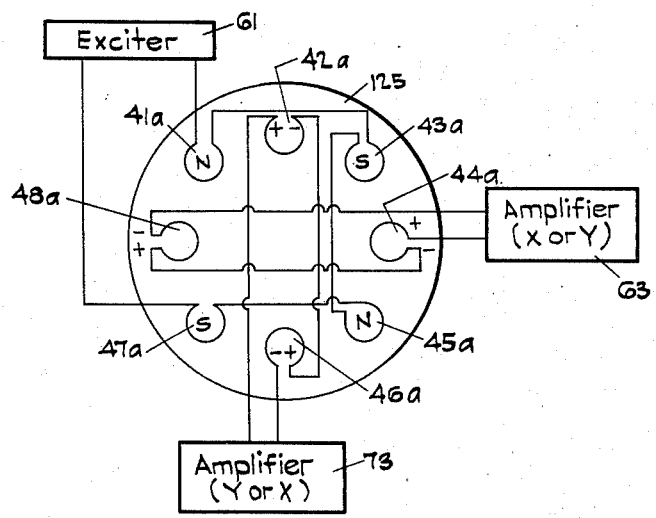
Fig. 8 is a diagram of another embodiment of the present probe.

Although the preferred shape of the sensing head is shown hereinabove with two excitation poles for a structure such as shown in Fig. 1, four exitation poles placed in approximately the positions of 41a, 43a, 45a and 47a have been successfully used. The sensing coils then lie between the exitation poles in approximately the positions of 42a, 44a, 46a and 48a and operate in the same manner as described for the present poles 52 and 56. Such a probe 125 is diagrammatically shown in Fig. 8. For the structure 11 at points such as 24, however, this type of sensing head had less sensitivity and a less favorable separation of phase angles than the preferred type shown in Figs. 2 and 3.

Reference has been made, in the description hereinabove, to electric motors actuating the tools which perform the desired operations. It is of course understood that said operations may be performed by motors or machinery other than electric, for example, by hydraulic or pneumatic means wherein the flow of the power fluid is controlled by an electric motor mechanism responsive to probe signals, and it is in this sense that the term "electric motor means" is used in the present claims.

The invention claimed is:

1. In a system for consecutively locating with high accuracy a desired point on a metallic body of relatively complex cross-section and performing an operation on said body at said point, the combination of a probe adapted to be positioned adjacent said body, said probe having at least two exciter coil means and at least two separate sensing coil means, a current source connected to said exciter coil means for passing an alternating current therethrough the sensing coil means being magnetically linked to the exciter coil means through said metallic body to produce signals when a current is passed through the exciter coil means, amplifier circuit means connected to said sensing coil means to amplify the signals produced thereby, supporting members for said probe and for said body, electric motor means mechanically connected to at least one of said supporting members, the input of said motor means being connected to the output of said amplifier circuit means, whereby said motor means are energized by signals from said sensing coil means to move said supporting members with regard to each other.

2. In a system for consecutively locating with high accuracy a desired point on a metallic body of relatively complex cross-section and performing an operation on said body at said point, the combination of a probe adapted to be positioned adjacent said body, said probe having at least two exciter coil means and at least two separate sensing coil means, a current source connected to said exciter coil means for passing an alternating current therethrough, the sensing coil means being magnetically linked to the exciter coil means through said metallic body to produce signals when a current is passed through the exciter coil means, amplifier circuit means connected to said sensing coil means to amplify the signals produced thereby, supporting members for said probe and for said body, electric motor means mechanically connected to at least one of said supporting members, the input of said motor means being connected to the output of said amplifier circuit means, whereby said motor means are energized by signals from said sensing coil means to move said supporting members with regard to each other, and tool means coordinated with said probe for performing an operation on said body upon the stoppage of said motor means.

3. In a system for consecutively locating with high accuracy a desired point on a metallic body of relatively complex cross-section and performing an operation on said body at said point, the combination of a probe adapted to be positioned adjacent said body, at least two exciter coil means carried by said probe, a current source connected to said exciter coil means for passing an alternating current therethrough, separate sensing coil means carried by said probe, the sensing coil means being magnetically linked to the exciter coil means through said metallic body to produce signals when a current is passed through the exciter coil means, first amplifier means, a portion of said sensing coil means being connected in series to the input of said first amplifier means, second amplifier means, another portion of said sensing coil means being connected in series to the input of said second amplifier means, supporting members for said probe and said body, first and second electric motor means mechanically connected to at least one of said supporting members to displace said members relative to each other, the relative displacement of said members by the first motor means being at right angles to their displacement by the second motor means, the input of said first motor means being energized by the output of the sensing coil means circuit comprising the first amplifier means, and the input of the second motor means being energized by the output of the sensing coil means circuit comprising the second amplifier means.

4. The system of claim 3, having a discriminator circuit connected between the output of said first amplifier means and the input of said first motor means, a second discriminator circuit connected between the output of said second amplifier means and the input of said second motor means, and conductor means connecting each of said discriminator circuits to the source of the exciter coil means current.

5. The system of claim 2, having a probe comprising a base element, a portion of said element being cut away to permit free movement of said tool with regard to said probe, a plurality of coils carried by said element, the axes of said coils extending at right angles from said element, means electrically connected to said probe for applying to a portion of said coils an energizing alternating current, and means electrically connected to said probe for conducting away the current induced in the rest of said coils through said body by said energizing alternating current.

6. The system of claim 2, having a probe comprising a centrally perforated plate, the diameter of the perforation through said plate being sufficient to permit said tool to move therein, a plurality of coils carried by said plate, the axes of said coils being at right angles to said plate, means electrically connected to said probe for applying to a portion of said coils an energizing alternating current and means electrically connected to said probe for conducting away the current induced through said body by said energizing alternating current in the rest of said coils.

7. The system of claim 2, having a probe comprising a base element, a portion of said element being cut away to permit free movement of said tool with regard to said probe, a plurality of coils carried by said element, the axes of said coils extending at right angles from said element, means electrically connected to said probe for applying to a portion of said coils an energizing alternating current, and means electrically connected to said probe for conducting away the current induced in the rest of said coils through said body by said energizing alternating current, said coils being wound in series opposition, whereby opposite instantaneous polarities are developed by said coils.

References Cited in the file of this patent

UNITED STATES PATENTS

| 1,069,995 | Anderson | Aug. 12, 1913 |
| 1,946,214 | Kabigting | Feb. 6, 1934 |
| 1,969,536 | Winne | Aug. 7, 1934 |
| 1,971,189 | Leibing | Aug. 21, 1934 |
| 2,370,845 | Davis | Mar. 6, 1945 |
| 2,479,293 | Bayless | Aug. 16, 1949 |